United States Patent

Smets

(10) Patent No.: US 8,894,379 B2
(45) Date of Patent: Nov. 25, 2014

(54) COMPRESSOR DEVICE

(75) Inventor: Alexander Antoon Frans M. Smets, Mortsel (BE)

(73) Assignee: Atlas Copco Airpower, N.V., Wilrijk (BE)

( * ) Notice: Subject to any disclaimer, the term of this patent is extended or adjusted under 35 U.S.C. 154(b) by 1216 days.

(21) Appl. No.: 12/223,124

(22) PCT Filed: Jan. 18, 2007

(86) PCT No.: PCT/BE2007/000011
§ 371 (c)(1),
(2), (4) Date: Jul. 23, 2008

(87) PCT Pub. No.: WO2007/087693
PCT Pub. Date: Aug. 9, 2007

(65) Prior Publication Data
US 2009/0016898 A1    Jan. 15, 2009

(30) Foreign Application Priority Data

Jan. 31, 2006    (BE) .................................. 2006/0062

(51) Int. Cl.
| | |
|---|---|
| F04B 49/00 | (2006.01) |
| F04C 28/08 | (2006.01) |
| F04B 49/20 | (2006.01) |

(52) U.S. Cl.
CPC ................. F04B 49/20 (2013.01); F04C 28/08 (2013.01)
USPC .................................. 417/22; 417/14; 417/18

(58) Field of Classification Search
USPC ........... 417/14, 18, 22, 32, 42, 44.1; 318/471; 62/215
See application file for complete search history.

(56) References Cited

U.S. PATENT DOCUMENTS

| | | | | |
|---|---|---|---|---|
| 4,046,532 A | * | 9/1977 | Nelson ............................ | 62/215 |
| 4,662,185 A | * | 5/1987 | Kobayashi et al. .......... | 62/228.4 |

(Continued)

FOREIGN PATENT DOCUMENTS

| | | | | |
|---|---|---|---|---|
| JP | 629166 A | | 1/1987 | |
| JP | 62029852 A | * | 2/1987 | ............. F24F 11/02 |

(Continued)

OTHER PUBLICATIONS

Examination Report of KPO regarding KR 10-2008-7020243, Jul. 21, 2011.

(Continued)

*Primary Examiner* — Alexander Comley
(74) *Attorney, Agent, or Firm* — Bacon & Thomas, PLLC

(57) ABSTRACT

Compressor including a housing (2) containing a compressor element (6) that is powered by a variable speed motor (7) with a control box (8) with a set maximum number of revolutions (Nmax) for the compressor element (6), an air cooling blower (10) which sucks air from the environment via an inlet (11) and blows it back to the environment through the housing (2) via an exhaust (12) and a cooling circuit (13) for the cooling of the gas which has been compressed by the compressor element (6), further wherein the control box (8) is equipped with an algorithm (24) that reduces the maximum allowed set number of revolutions (Nmax) to a defined level as soon as the monitored environmental temperature (T20) rises above a maximum set level (Tmax), and the maximum allowed set number of revolutions (Nmax) is increased as soon as the environmental temperature (T20) falls below the maximum set level (Tmax).

6 Claims, 1 Drawing Sheet

(56) References Cited

U.S. PATENT DOCUMENTS

| | | | |
|---|---|---|---|
| 5,718,563 A * | 2/1998 | Hutchinson | 417/32 |
| 6,799,950 B2 * | 10/2004 | Meier et al. | 417/12 |
| 6,868,686 B2 * | 3/2005 | Ueda et al. | 62/228.4 |
| 7,442,012 B2 * | 10/2008 | Moens | 417/32 |
| 2002/0088241 A1 * | 7/2002 | Suitou et al. | 62/228.4 |
| 2003/0182952 A1 * | 10/2003 | Brooke | 62/180 |
| 2005/0214128 A1 * | 9/2005 | Moens | 417/18 |
| 2006/0090490 A1 * | 5/2006 | Grimm et al. | 62/181 |

FOREIGN PATENT DOCUMENTS

| | | |
|---|---|---|
| JP | 634188 | 5/1994 |
| JP | 10197126 A | 7/1998 |
| JP | 11148761 A | 6/1999 |
| JP | 2003-121032 A | 4/2003 |
| JP | 2004360998 A | 12/2004 |
| JP | 2005240787 A | 9/2005 |
| WO | WO 2004/022977 A1 | 3/2004 |

OTHER PUBLICATIONS

Japanese Office Action for JP 2008-552649, dated Sep. 25, 2012.

Japanese Office Action for JP 2008-552649, dated Oct. 4, 2011 and English translation thereof.

English Translation of Russian Office Action dated Feb. 10, 2010 for RU 2008135310/06.

* cited by examiner

COMPRESSOR DEVICE

BACKGROUND

A. Field

The present invention concerns a compressor device.

B. Related Technology

More particularly the present invention concerns a compressor device of the variable speed type that basically consists of a case or housing with a compressor element therein that is powered by a variable speed motor with a fixed set maximum number of revolutions for the compressor, an air cooling blower which sucks air from the environment via an inlet and blows it via an exhaust through this case back to the environment, and a separate cooling circuit with a cooling medium for cooling of the gas which has been compressed by the compressor or cooling compressed air from the compressor.

Common compressor devices are generally designed in order to be able to function in certain conditions of maximum environmental temperature, these conditions are named as the nominal working conditions.

In the case that the limits of the nominal environmental conditions are exceeded, then, the good working of the compressor device can no longer be guaranteed and that will lead to unpredictable stoppages of the compressor device.

In such a case it is presently the practice to use a compressor device which is over sized and therefore generates less heat than a smaller compressor device in the same conditions or a compressor device which is working at its maximum capacity by limiting the set maximum allowed number of revolutions of the compressor, for example, through the application of a transmission with a smaller transmission ratio than for nominal conditions. Therefore an extra thermal reserve is created, that can used in order to counter act the higher environmental temperature.

This has the disadvantage that a bigger investment is necessary for the compressor device and that the compressor device is not optimally utilized under all nominal conditions with the result that there is a loss of performance in nominal conditions.

BRIEF SUMMARY OF THE INVENTION

The present invention aims to provide a solution to one or more of the above mentioned and other disadvantages, as it provides an improved compressor device which is equipped with a self-regulating control which ensures that the compressor device even at maximum performance can be employed in all environmental temperatures with permanently optimal cooling operation. For this purpose the invention concerns an improved compressor device that mainly consists of a case with a compressor element inside that is powered by variable speed motor with a control box or unit having a setting for a maximum number of revolutions of the compressor, an air cooling blower which sucks air from the environment via an inlet and blows it back to the environment once this has passed through the case, via an exhaust, and a cooling circuit for cooling of gas which has been compressed by the compressor, characterised in that the control box is equipped with an algorithm that reduces the abovementioned maximum allowed set number of revolutions in accordance with a defined value as soon as the measured environmental temperature rises above a maximum set level and increases the maximum allowed set number of revolutions as soon as the environmental temperature falls under the above mentioned level.

The advantage of such a device according to the invention is that, when the environmental temperature rises above the nominal level for which the compressor device is designed, the maximum allowed number of revolutions will be automatically reduced, as a result of which the compressor device will develop less heat and the cooling capacity of the air cooling blower is sufficient for the compressor, even in this elevated environmental temperature, to keep cooling sufficient in order to avoid unwanted stoppages due to overheating and to guarantee good working of the device.

Preferably the abovementioned algorithm is such additionally, that the maximum set number of revolutions is further reduced when the temperature of the abovementioned cooling of the compressed gas is insufficient or the temperature of the cooling medium rises above a set level.

Through the monitoring of the temperature of the environmental air and/or the cooling continuously or intermittently and the adjusting of the maximum set allowed number of revolutions as a function of the measurement results, the compressor device will be able to function even in higher environmental temperatures than is nominally provisioned, permanently at its maximum capacity without risk of stoppages or damage.

Generally the case includes an electronic compartment which is equipped with an air cooling blower which sucks environmental air via an entrance and blows it back to the environment via an exit, whereby in order to avoid any damage being caused to the electronic components, a maximum level is imposed for the temperature of the cool air which is used for this purpose. The air cooling of this electronic compartment is normally calculated for nominal conditions and by exceeding the maximum temperature of the cool air, this will lead to unwanted stoppages of the compressor device.

According to an additional aspect of the invention, in this case, an additional cooling arrangement can be provisioned for the cooling of the air that functions as a cooling medium of the electronic compartment, whereby this cooling is only switched on when the environmental temperature threatens to rise above a set level. This in order to keep the energy costs as low as possible.

This additional cooling can function independently or can be used in combination with the algorithm for the control of the maximum set number of revolutions of the compressor device, whereby this cooling is controlled preferably by the abovementioned control box of the compressor device.

BRIEF DESCRIPTION OF THE DRAWINGS

With the intention to better show the characteristics of the invention, hereafter, as an example without any limited character, a preferred form of embodiment of the compressor device according to the invention, is described with reference to the attached drawings, wherein.

DETAILED DESCRIPTION OF PREFERRED EXEMPLARY EMBODIMENTS

Figure 1:
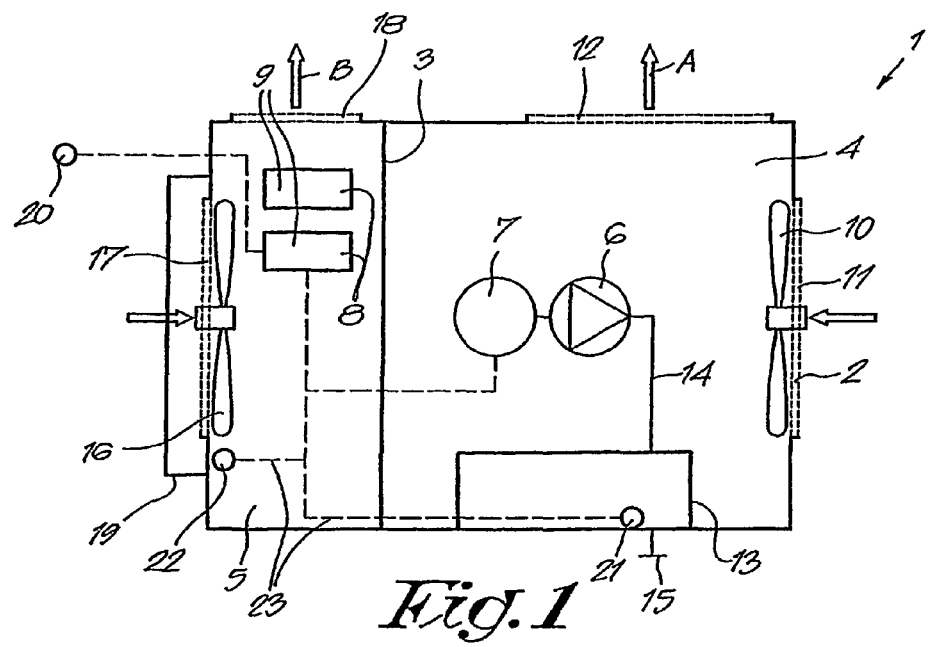
FIG. 1 shows schematically a compressor device according to the invention.

The compressor device 1 of FIG. 1 consists basically of a case or housing 2, which, in this case is divided into two compartments 4 and 5 by a wall 3, wherein in the compartment 4 a compressor element 6 is provided which is powered by a variable speed motor 7, for example a frequency controlled motor, controlled by a control box or unit 8 having a setting for a set maximum number of revolutions Nmax of the motor and a compartment 5 containing an electronic compartment wherein electronic components 9 are located, including for example the above mentioned control box 8.

The compartment 4 is cooled by an air cooling blower 10 which sucks environmental air via an inlet 11 and blows it back to the environment through the compartment 4 of the case 2 via an exhaust 12, as is shown with the arrows A. The compressor device 1 is further equipped with a cooling circuit 13, with or without a cooling medium like oil, water or similar for the cooling of the gas that is compressed by the compressor and via a discharge pipe 14 and a connection 15 can be delivered to a discharge air supply system (not shown).

The electronic compartment 5 includes air cooling blower 16 which sucks environmental air via an entrance 17 and blows it back to the environment over the electronic compartment 5 via an exit 18 as is displayed by arrows B.

Although in FIG. 1 a compressor device is shown in which the air cooling blowers 10 and 16 of the compartments 4 and 5 are separated, it is not excluded that these air blowers 10 and 16 could be common or that they include common parts.

Additionally in accordance with the invention a cooling arrangement 19 is provisioned for the cooling of the air sucked by the air cooling blower 16.

Further the compressor device 1 includes first temperature sensor 20 arranged to sense (i.e., measure) the temperature T20 of the environmental air; second temperature sensor 21 arranged to sense the temperature T21 of the cooling circuit 13 for the compressor gas, for example, at the exit of the cooling circuit 13, and third temperature sensor 22 arranged to sense the temperature T22 of the cool air which flows through the electronic compartment 5 for the cooling of electronic component 9. These temperature sensors 20, 21 and 22 are electronically connected with the above mentioned control box 8 via connections 23.

The compressor device is designed so as to be able to operate in nominal conditions under maximum environmental temperature Tmax which is set in the control box 8.

Figure 2:
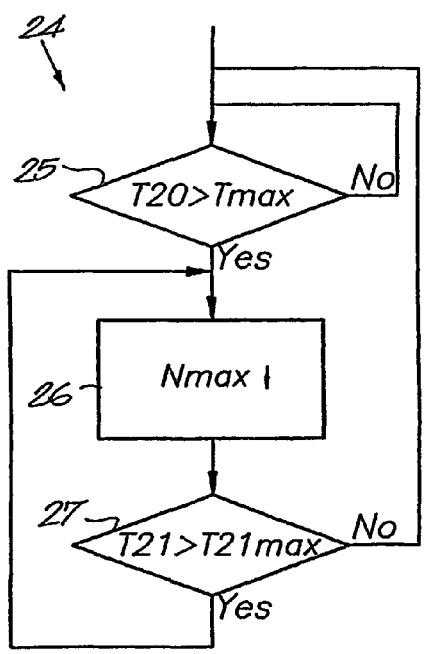
FIGS. 2 and 3 show two control algorithms which can be applied by the device of FIG. 1.

The control box 8 is according to the invention equipped with an algorithm 24 that is systematized in FIG. 2 for the setting of the maximum number of revolutions Nmax of the compressor element 6, by which in the first phase 25 the environmental temperature T20 is compared with the set level Tmax of the environmental temperature and by which in a following phase 26 this maximum allowed number of revolutions Nmax with a defined level is reduced as soon as the environmental temperature T20 threatens to rise above a maximum set level Tmax and the maximum set allowed number of revolutions is again raised to its initial level as soon as the environmental temperature T20 comes below the above mentioned level Tmax.

Preferably the maximum set number of revolutions Nmax is adjusted in such a way by the algorithm that the cooling capacity of the air cooling blower 10 is at all times sufficient with the monitored environmental temperature in order to allow the compressor element 6 to operate at this adjusted maximum set number of revolutions Nmax without the danger of over heating.

In a following phase 27 of algorithm 24 the temperature T21 of the cooling medium of the cooling circuit 13 and/or of the temperature of the compressed air are compared with the maximum set temperature level T21max and as in phase 26 the maximum set allowed number of revolutions Nmax is again reduced when the temperature T21 of the above mentioned cooling medium rises above the set level T21max.

It is clear that this algorithm can be carried out continuously or regularly intermittently and that the value with which the maximum set number of revolutions is reduced or adjusted can be a function of the measuring results and therefore of the difference between the measured temperatures and the corresponding maximum set levels.

The working of the compressor device 1 is simple and as follows.

When the environmental temperature T20 rises over the maximum set level Tmax, the set maximum number of revolutions Nmax will be reduced, with a defined value as a result of which the compressor element 6 will/can be powered by a lower number of revolutions, which results in a reduced heat generation which is the primary function of the number of revolutions of the compressor element 6 and of the compression pressure of the pressurized gas at the exit of the compressor element 6.

Moreover with this regulation there is a danger that the temperature T21 of cooling circuit 13 will be too high, the maximum set number of revolutions Nmax will be set at an even lower level so that there will not be any danger whatsoever of over heating of the compressor parts in compartment 4.

In this way it is ensured that the compressor device 1 can permanently be powered to a maximum number of revolutions and therefore with a maximum capacity pressurized gas, bearing in mind, the available cooling capacity of the air cooling 10 and of the cooling circuit 13. Therefore it is not necessary to provide any over measured cooling as is usually the case with previously known compressor devices.

This regulation does not normally occur between the normal control of the motor's number of revolutions but it works with dynamic limited number of revolutions.

Figure 3:
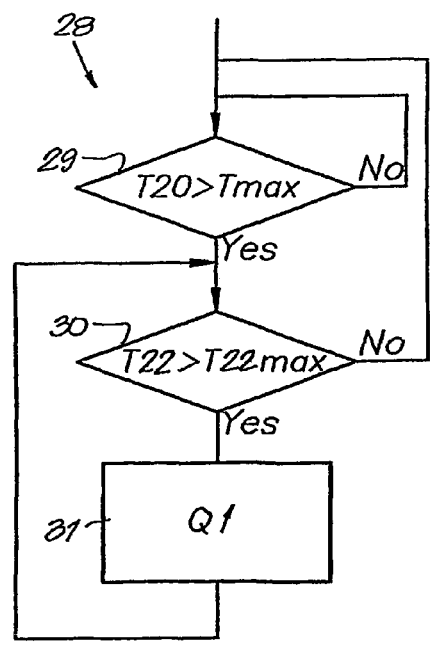

The control box 8 can be optionally equipped with a second algorithm 28 which is schematically displayed in FIG. 3 and that is meant to ensure the protection of the electronic components 9 in the electronic compartment 5, bearing in mind, the fact that these components 9 cannot be unprotected at high temperatures and that as a result the temperature T22 of the cool air which flows through the electronic compartment 5 cannot rise above a certain critical maximum level.

Algorithm 28 compares the environmental temperature T20 in a first phase 29 with a maximum set level Tmax, which may or may not be the same as that which is used for algorithm 24, and compares in a second phase 30 the temperature T22 of the cool air in compartment 5 with the previous set maximum level T22max.

When the environmental temperature T20 rises higher than T20max, the cooling arrangement 19 switches on and the cool air which is sent through the electronic compartment becomes additionally cooled.

When both the environmental temperature T20, and the temperature of the cool air T22 rise higher than their respectively set maximum levels Tmax and T22max, then in phase 31 the cooling capacity Q of cooling arrangement 19 is set higher so as to decrease the temperature of the cool air T22 just under the critical temperature of electronic components 9.

This second algorithm 28 offers the following advantages:
  the air cooling 16 does not have to be over sized to compensate for the nominal environmental temperatures;
  There are no energy losses for extra cooling when the air cooling blower 16 is sufficient, as it is in case of normal environmental temperatures;
  by the additional cooling of the cool air of the electronic compartment 5 to allow cooling to just below the critical temperature of component 9, extra energy is saved, by the minimum cooling capacity. This results in that the total efficiency of the machine stays as high as possible.

Also the second algorithm can be applied with a certain frequency continuously or intermittently.

It is clear that both algorithms 24 and 28 can be applied individually, separately or together in compressor device 1. It is also clear that both algorithms can be applied in the same control box 8 or in separate control boxes.

The present invention is in no way limited to the embodiment described by way of example and displayed in the figures but, an improved compressor device according to the invention be realised in all shapes and dimensions without departure from the scope of the invention.

The invention claimed is:

1. A gas compressor comprising: a gas compressor element; a variable speed motor powering the gas compressor element; a motor control unit for the variable speed motor having a setting for a maximum number of revolutions (Nmax) for the compressor element; an air blower arranged to suck environmental air via an inlet and to blow it back to the environment through a housing via an exhaust; a cooling circuit arranged to cool gas which has been compressed by the compressor element; a first temperature sensor arranged to sense an environmental temperature; said housing configured to contain said gas compressor element, variable speed motor, motor control unit, air blower, and cooling circuit, wherein said housing comprises an electronic compartment which is equipped with a second air cooling blower configured to suck in environmental air via an entrance and blow it back into the environment via an exit, an additional cooling arrangement to cool the air moved by the second air cooling blower of the electronic compartment, a second temperature sensor configured to sense a temperature of air that is cooled by the additional cooling arrangement, and an arrangement to increase a cooling capacity of the additional cooling arrangement when the sensed temperature of the cooled air cooled by the additional cooling arrangement rises above a set maximum additional cooling arrangement critical level (T22max), and an arrangement for adjusting the additional cooling arrangement, wherein said additional cooling arrangement being operational when the sensed environmental temperature approaches a level above a maximum set environmental temperature level (Tmax), wherein the cooling capacity of the additional cooling arrangement is adjustable so that the temperature of the cool air which flows through the electronic compartment is maintained under the maximum additional cooling arrangement critical level (T22max), and wherein the motor control unit includes an algorithm that reduces the maximum set number of revolutions (Nmax) by a desired level when the sensed environmental temperature rises above the maximum set environmental temperature level (Tmax) and increases the maximum allowed set number of revolutions (Nmax) when the sensed environmental temperature falls below said maximum set environmental temperature level (Tmax).

2. The gas compressor according to claim 1, wherein the arrangement for controlling the additional cooling arrangement is said motor control unit.

3. The gas compressor according to claim 1, wherein the algorithm is configured so that the maximum set number of revolutions (Nmax) is adjusted so that a cooling capacity of the air blower at the sensed environmental temperature is sufficient to permit the gas compressor element to operate at the adjusted maximum set number of revolutions (Nmax) without danger of over heating or unwanted stoppages.

4. The gas compressor according to claim 1, wherein the algorithm is configured so that the maximum set number of revolutions (Nmax) is further reduced when a sensed temperature of the cooling circuit rises above a set cooling circuit temperature level (T21max).

5. The gas compressor according to claim 1, wherein either or both a temperature of the environment and the cooling circuit is or are continuously or intermittently measured via said temperature sensors arranged to sense the temperature of the environment and the temperature of the cooling circuit and the maximum set number of revolutions (Nmax) is adjusted as a function of the sensed temperatures.

6. The gas compressor according to claim 1, further comprising a third temperature sensor for sensing a temperature in the electronic compartment, wherein the set maximum level (Tmax) of the environmental temperature is defined by the temperature in the electronic compartment of a component in the electronic compartment.

* * * * *